No. 866,876. PATENTED SEPT. 24, 1907.
A. H. MEECH.
ROPE OR CABLE CLAMP.
APPLICATION FILED MAR. 13, 1906.
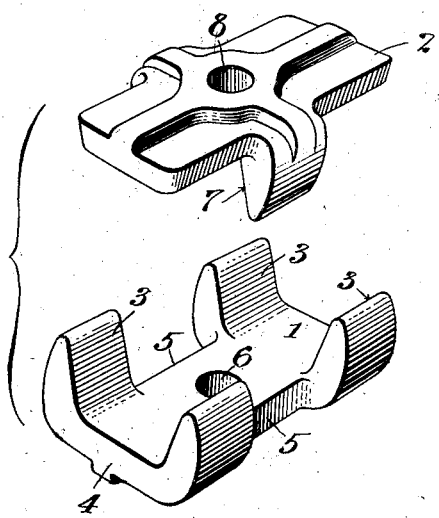
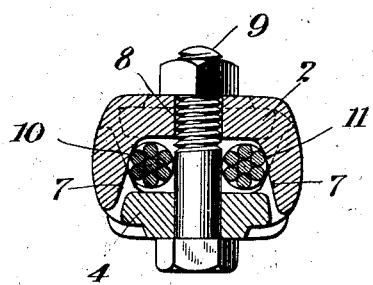
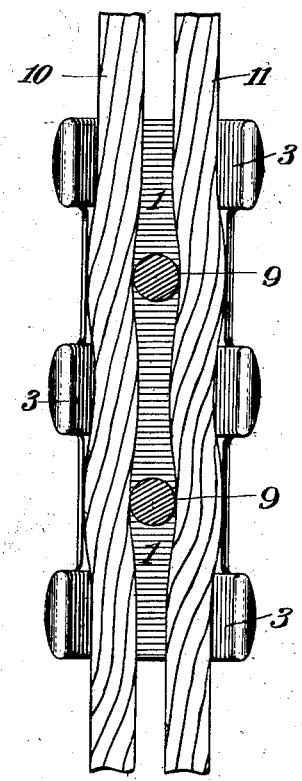
Witnesses
Inventor
Alfred H. Meech
By his Attorneys

UNITED STATES PATENT OFFICE.

ALFRED H. MEECH, OF CHATHAM, NEW YORK.

ROPE OR CABLE CLAMP.

No. 866,876.　　　　　　Specification of Letters Patent.　　　　Patented Sept. 24, 1907.

Application filed March 13, 1906. Serial No. 305,767.

*To all whom it may concern:*

Be it known that I, ALFRED H. MEECH, a citizen of the United States, residing at Chatham, in the county of Columbia and State of New York, have invented certain new and useful Improvements in Rope or Cable Clamps, of which the following is a full, clear, and exact description.

This invention relates to rope and cable clamps, the principal object being to provide a clamp which can be quickly applied to ropes or cables of varying sizes, and which is so constituted as to deflect the rope or cable, by the clamping action into a tortuous or bent form. The clamp is also designed to bite the cable at one or more points along the length thereof, in conjunction with the bending action.

A further object of the invention is to embody the principles and features above stated, in a simple structure, not requiring any careful tool or machine work, which can be sold cheaply on the market and which is strong and durable.

With these objects in view the invention consists in the features of construction hereinafter described and claimed.

In the drawing, Figure 1 shows the various parts of a clamp embodying the principles of my invention in positions ready for assembling upon a cable. Fig. 2 is a sectional view showing the action of the clamp in adjusting itself to cables of different sizes. Fig. 3 is a sectional view of a modified construction, illustrating the deflection of the cable into tortuous form or bends by the clamping action.

The principal aim of my invention is to provide a clamp which is capable of fastening the ends of steel wire cables with a security equal to the tensile strength of the cable.

On account of the fact that the surface friction of polished steel wire is low, a clamp which merely relies on such surface friction is very unlikely to have as great a fastening power as the strength of the cable. It has accordingly been customary to use a number of clamps, or clamps with a great many bolts or parts in order to obtain the desired security.

In carrying out my invention I secure by the clamping pressure, a deflection of the cable elements, so that as the result of the gripping pressure there is secured a bend in the cable, the amount of which may be made as great as necessary and proportional to the gripping force. The clamping members are also designed to bite the cable at one or more points and thereby obtain an additional security.

In the drawings in which like parts are designated by the same reference sign wherever they occur, 1 indicates what I shall term the deflection member, and 2 the clamping member of a two part cable clamp. The essential characteristic of the deflection member 1, is the provision of wedging faces 3, inclined to one another and located opposite one another in a direction transverse of the member. In other words, there are provided wedging faces 3, in opposite pairs, the different pairs being in spaced transverse planes along the length of the member. Intermediate the adjacent pairs of the wedging faces I provide one or more abutments 9, which may be ordinary bolts. These bolts have a triple function. First, to hold the two clamping members together. Second, to coöperate with the wedging faces so as to deflect the cables into tortuous form. Third, to bite the cable as will hereinafter appear.

The deflection member 1, is preferably constructed with a back 4, and the wedging faces 3, above mentioned, are located on legs projecting from the back. 5 indicates intermediate cut away portions of the deflection member, and 6 is a bolt hole, of which there may be as many as desired, occupying a position intermediate to the transverse planes in which the wedging faces 3 act.

The clamping member 2, is designed to press the cable into engagement with the wedging faces 3 of the member 1. This causes the deflection of the cable into bent or tortuous form, as above stated. The clamping member 2 is also designed to bite the cable against the bolt or bolts 9. For this purpose there are provided what I shall term gripping faces 7, disposed to act in transverse planes intermediate those of the wedging faces 3, of the opposite clamping member, in which relation the gripping faces 7, lie opposite the bolt holes 6. The clamping member is also provided with a bolt hole or holes 8, which falls in alinement with the bolt hole or holes 6 in use. 9 indicates the ordinary bolt or bolts, which may be passed through the alined bolt holes.

The use and operation is as follows:—It being desired to fasten together two adjacent pieces of rope or cable, indicated at 10 and 11, which may be the free ends of separate pieces, or parts of the same cable produced in the formation of an eye; the two sections are laid side by side within the deflection member 1. In this relation the bolts 9 are inserted in the holes 6 so as to lie between the cable sections. The clamp is adapted for use with cables of different diameters, within certain limits, it being evident that small cables will pass downward upon the wedge faces 3 a greater distance than large cables, the cable in all cases finding a position where it is inclosed snugly by the bolts 9 and points on the wedge faces 3. The clamping element 2 is now slipped into position over the bolts 9, and ordinary nuts placed on said bolts and tightened, so that the clamping element 2 is pressed downward and the inclined faces 7 are borne against the cable sections and press them inward against the member 1. At this time the wedge faces 3 become effective to buckle or bend the cable slightly around the various intermediate bolts, so that the cable takes on a series of bends between the gripping surfaces, as clearly indicated in Fig. 3. As above stated, the gripping faces 7 have a purpose additional to their function in pressing the cables downward into the tortuous form above mentioned, which is to secure a powerful biting force upon the cables in conjunction with the walls formed by the various bolts. The inclined nature of the faces 7 permits them to exercise the function of pressing the cable downward and at the same time biting it securely against the bolt walls. Thus the cable is rigidly bit in a series of transverse planes corresponding to the several bolts, and is deflected intermediate such clamped portions into bends which have a very great effect to increase the resisting force of the clamp. Another effect of the inclined surfaces 3 and 7, is that the clamp is capable of according itself to cables of different diameters. For example a single clamp may be capable of taking a 3/8″ cable or a 5/16″ cable, the clamping members being drawn further together in case of the 5/16″ cable than with the 3/8″ cable.

In the above description I have referred to the use of one, or more than one bolts for clamping the members together. It is to be understood that a greater number of bolts would be necessary for large than for small cables; in practice one bolt is employed for small cables, two for cables of medium size, and a larger number for larger sizes. If more than one bolt is used the number of faces 3 and 7 is of course proportionately increased, as shown in Fig. 3. In the annexed claims I therefore do not wish to be limited to the use of one bolt; the expression a bolt being intended to read on the structure of Fig. 3, as well as that of Fig. 1.

What I claim, is:—

1. A cable clamp comprising two members, one having opposed wedge faces inclined to one another and located in pairs along the length of the member, and an abutment between adjacent pairs of the wedge faces and arranged to project between the cables to be clamped.

2. A cable clamp comprising two members, one having opposed gripping faces inclined to one another and located opposite one another in a direction transverse of the member, and an abutment projecting between the cables to be clamped and between said faces and coöperating therewith to bite the cables.

3. A cable clamp comprising a member having opposed gripping faces inclined to one another and located opposite one another in a direction transverse of the member, an abutment between said faces and coöperating therewith to bite the cable, and a plurality of pairs of opposed wedge faces coöperating with said abutment to deflect the cable into a tortuous form.

4. A cable clamp comprising two members, one having wedge faces, and an abutment arranged to project between and engage the cables to be clamped at places intermediate said wedge faces longitudinally of the member, whereby the cable is deflected into a series of bends.

5. A cable clamp, comprising a deflection member having wedge faces in spaced transverse planes along its length, an abutment at a point intermediate of the adjacent pairs and coöperating with said faces to deflect a cable into a tortuous form, and a clamping member separate from said abutment.

6. In a cable clamp, a pair of members each having legs with inside wedge faces adapted to engage a pair of cable sections to press them toward one another, and an abutment between the cable sections whereby they are deflected.

In witness whereof, I subscribe my signature, in the presence of two witnesses.

ALFRED H. MEECH.

Witnesses:
FRANK S. OBER,
WALAR M. CHAPIN.